US010996070B2

(12) United States Patent
Yang

(10) Patent No.: US 10,996,070 B2
(45) Date of Patent: May 4, 2021

(54) ROUTE GUIDANCE APPARATUS AND METHOD

(71) Applicants: Hyundai Motor Company, Seoul (KR); Kia Motors Corporation, Seoul (KR)

(72) Inventor: Woo Sok Yang, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/659,056

(22) Filed: Oct. 21, 2019

(65) Prior Publication Data

US 2020/0318989 A1     Oct. 8, 2020

(30) Foreign Application Priority Data

Apr. 5, 2019    (KR) .................. 10-2019-0040047

(51) Int. Cl.
     *G01C 21/36*       (2006.01)
     *G06T 11/00*       (2006.01)
     *G06K 9/00*        (2006.01)

(52) U.S. Cl.
     CPC ..... *G01C 21/3667* (2013.01); *G01C 21/3602* (2013.01); *G06K 9/00791* (2013.01); *G06T 11/00* (2013.01)

(58) Field of Classification Search
     CPC .. G01C 21/3667; G01C 21/3626–3685; G06K 9/00791; G02B 27/00
     See application file for complete search history.

(56) References Cited

U.S. PATENT DOCUMENTS

| | | | | |
|---|---|---|---|---|
| 8,483,447 B1 * | 7/2013 | Arfvidsson | ........ | G01C 21/3673 382/113 |
| 9,488,488 B2 * | 11/2016 | Waldman | ........... | G01C 21/3679 |
| 10,296,083 B2 * | 5/2019 | Sung | ..................... | G06F 3/1431 |
| 2003/0128436 A1 * | 7/2003 | Ishii | ...................... | G02B 27/01 359/630 |
| 2007/0140527 A1 * | 6/2007 | Yamamoto | ......... | G06K 9/00805 382/104 |
| 2010/0131197 A1 * | 5/2010 | Zhang | .................... | G01C 21/36 701/533 |
| 2010/0250116 A1 * | 9/2010 | Yamaguchi | ........ | G01C 21/3647 701/533 |

(Continued)

FOREIGN PATENT DOCUMENTS

KR       100815153 B1     3/2008

*Primary Examiner* — Robert J Hance
(74) *Attorney, Agent, or Firm* — Mintz Levin Cohn Ferris Glovsky and Popeo, P.C.; Peter F. Corless

(57) ABSTRACT

A route guidance apparatus and method are provided. The route guidance apparatus includes an image acquisition unit that collects image data of an area in front of a vehicle using a camera and a driver view recognition unit that calculates the range of a driver viewing angle by detecting a driver eye height driver a driver's gaze direction. An image processing unit extracts a region of interest corresponding to the range of the driver viewing angle from the image data and generates a route guidance image by overlaying a direction indicator corresponding to a driving route on the region of interest. A display unit outputs the route guidance image.

13 Claims, 8 Drawing Sheets

(56) References Cited

U.S. PATENT DOCUMENTS

| | | | |
|---|---|---|---|
| 2015/0105934 A1* | 4/2015 | Palmer | B60R 1/00 |
| | | | 701/1 |
| 2016/0003636 A1* | 1/2016 | Ng-Thow-Hing | G08G 1/167 |
| | | | 701/26 |
| 2016/0065903 A1* | 3/2016 | Wang | B60R 11/04 |
| | | | 348/148 |
| 2017/0060234 A1* | 3/2017 | Sung | G06F 3/1431 |
| 2018/0126901 A1* | 5/2018 | Levkova | G06K 9/00597 |
| 2019/0265712 A1* | 8/2019 | Satzoda | B60W 40/09 |
| 2020/0116518 A1* | 4/2020 | Lee | G06K 9/00791 |
| 2020/0189390 A1* | 6/2020 | Viswanathan | G06K 9/00201 |
| 2020/0318989 A1* | 10/2020 | Yang | G01C 21/3602 |

\* cited by examiner

ROUTE GUIDANCE APPARATUS AND METHOD

CROSS REFERENCE TO RELATED APPLICATION(S)

This application claims the benefit of Korean Patent Application No. 10-2019-0040047, filed on Apr. 5, 2019, which is hereby incorporated by reference as if fully set forth herein.

BACKGROUND

Field of the Invention

The present invention relates to a route guidance apparatus and method, and more particularly, to a route guidance apparatus and method that match image data collected by a camera with a driver's visible region to determine the size of a direction indicator according to a remaining distance and recognize change in direction.

Discussion of the Related Art

In general, a route guidance apparatus displays a digital map on a screen, displays change of direction of a driving route or whether traveling straight is maintained at one side of the screen, and thereby provides route guidance which a driver may easily recognize. Further, in addition to the general route guidance apparatus, an augmented reality (AR) navigation apparatus which provides a current road image captured by a camera to a screen and provides a route to a destination overlaid on the corresponding image has appeared. Such an AR navigation apparatus provides a route on a digital map and additionally provides a real road image at one side of the screen, thereby configuring the screen to allow a driver to recognize current change of direction.

However, the general route guidance apparatus does not provide a real road image directly on the screen, thus lowering realism and causing a difficulty in intuitively identifying a route direction. Further, the recent AR navigation apparatus generates a load when a driver recognizes a real road image in a situation in which forked roads continuously appear or it is difficult to recognize a distance, due to an error between the real road image and a visible region recognized by a driver, and lowers connectivity to direction indicators, thus causing reduction of driving safety.

Therefore, a route guidance apparatus which does not hinder realism on a screen providing a real complex road image and may reduce a driver's cognitive load and clearly identify momentary change of direction is required.

SUMMARY

Accordingly, the present invention provides a route guidance apparatus and method that substantially obviate one or more problems due to limitations and disadvantages of the related art. An object of the present invention is to provide a route guidance apparatus and method which may match image data collected by a camera with a driver's visible region and flexibly determine the size of a direction indicator according to a remaining distance, to clearly recognize change in direction without hindering realism.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a route guidance apparatus may include an image acquisition unit configured to collect image data of an area in front of a vehicle, photographed by a camera, a driver's view recognition unit configured to calculate the range of a driver's viewing angle by detecting a driver's eye height and a driver's gaze direction, an image processing unit configured to extract a region of interest that corresponds to the range of the driver's viewing angle from the image data and to generate a route guidance image by overlaying a direction indicator that corresponds to a driving route on the region of interest, and a display unit configured to output the route guidance image.

The region of interest may be a region that corresponds to the driver's gaze direction, out of the image data. The route guidance apparatus may further include a road configuration recognition unit configured to detect a guide point on the driving route. The image processing unit may be configured to determine at least one of a size, a shape or a position of the direction indicator based on a remaining distance from a current position of the vehicle to the guide point. The guide point may include at least one of a forked road, an entrance/exit section, a roundabout, an intersection or a turn point.

The image processing unit may be configured to identify at least one object interfering with the guide point in the region of interest. The image processing unit may be configured to acquire a street view image that corresponds to the current position of the vehicle, and match the street view image with an area of the region of interest, in which the at least one object is displayed. The image acquisition unit may be configured to variably adjust a frame rate of the image data received from the camera using current speed information of the vehicle.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate exemplary embodiment(s) of the invention and together with the description serve to explain the principle of the invention. In the drawings.

DETAILED DESCRIPTION

Figure 1:
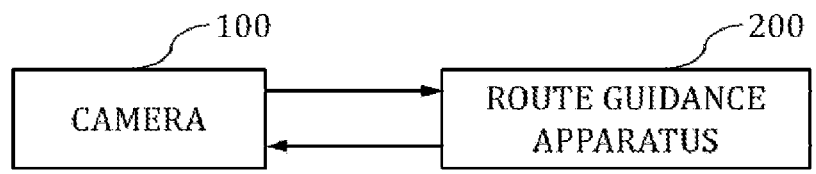
FIG. 1 is a schematic block diagram of a route guidance system in accordance with one exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Reference will now be made in detail to the exemplary embodiments of the present invention, examples of which are illustrated in the accompanying drawings. However, the disclosure of the invention is not limited to the exemplary embodiments set forth herein and may be variously modified. In the drawings, to clearly describe the present invention, description of elements which are not related to the present invention is omitted, and the same or similar elements are denoted by the same reference numerals even though they are depicted in different drawings.

In addition, in the following description of the embodiments, the terms "first", "second", etc. may be used to describe various elements, but do not limit these elements. It will be understood that these terms are used only to discriminate one element from other elements, and do not limit the nature, sequence or order of the corresponding element. It will be understood that terms which are specially defined in consideration of the configurations and functions of the exemplary embodiments are used only to describe the embodiments and do not limit the scope of the exemplary embodiments.

It will be understood that a singular expression of an element encompasses a plural expression of the element unless stated otherwise. In the following description of the embodiments, the terms "including", "having", etc. will be interpreted as indicating the presence of one or more other characteristics, numbers, steps, operations, elements or parts stated in the specification or combinations thereof, and do not exclude presence of characteristics, numbers, steps, operations, elements, parts or combinations thereof, or possibility of adding the same, unless stated otherwise.

In the following description of the exemplary embodiments, all terms including technical or scientific terms have the same meanings as generally understood by those skilled in the art to which the present invention pertains, unless defined otherwise. Further, in the following description of the exemplary embodiments, generally used terms, such as terms defined in dictionaries, will be interpreted as having meanings coinciding with contextual meanings in the related art, and are not to be interpreted as having ideal or excessively formal meanings, unless defined clearly.

Hereinafter, a route guidance system in accordance with each exemplary embodiment of the present invention will be described with reference to the accompanying drawings.

FIG. 1 is a schematic block diagram of a route guidance system in accordance with one exemplary embodiment of the present invention. As exemplarily shown in FIG. 1, a route guidance system 10 in accordance with one exemplary embodiment of the present invention may include a camera 100 (or other imaging device) to provide real world images at the outside of a vehicle and a route guidance apparatus 200 configured to display route guidance using the corresponding images. In one exemplary embodiment, the camera 100 and the route guidance apparatus 200 may be mounted within the vehicle, and be interconnected wirelessly or by wire.

The camera 100 may be configured to continuously collect external images of surroundings of the vehicle while the vehicle is being driven, and acquire high-resolution images without blurring or breaking while maintaining a wide angle of view. Although the camera 100 may correspond to, for example, a camera installed within the vehicle, such as a black box for vehicles, to photograph images in front of the vehicle, the scope of the invention is not limited thereto, and the camera 10 may include a front camera provided in a vision sensor or an advanced driver assistance system (ADAS) sensor.

The route guidance apparatus 200 may be mounted within the vehicle and may be configured to provide notifications to a driver of information, such as a current position of the vehicle and a map of the surroundings of the vehicle, and a driving route to a destination. In addition, the route guidance apparatus 200 may provide a high-resolution display to provide a clear screen. In the route guidance system 10 in accordance with one exemplary embodiment, the route guidance apparatus 200 may be configured to request reception of external images from the camera 10, and then, the camera 100 may be configured to acquire external images of the surroundings of the vehicle in real time and transmit the external images to the route guidance system 10. Further, the route guidance system 200 may be configured to provide a guidance image visually optimized to the driver by processing the external images.

Otherwise, when the route guidance system 200 requests reception of external images from the camera 100, the camera 100 may be configured to acquire external images of the surroundings of the vehicle in real time, produce a guidance image visually optimized to the driver by processing the external images, and transmit the guidance image to the route guidance apparatus 200.

Figure 2:
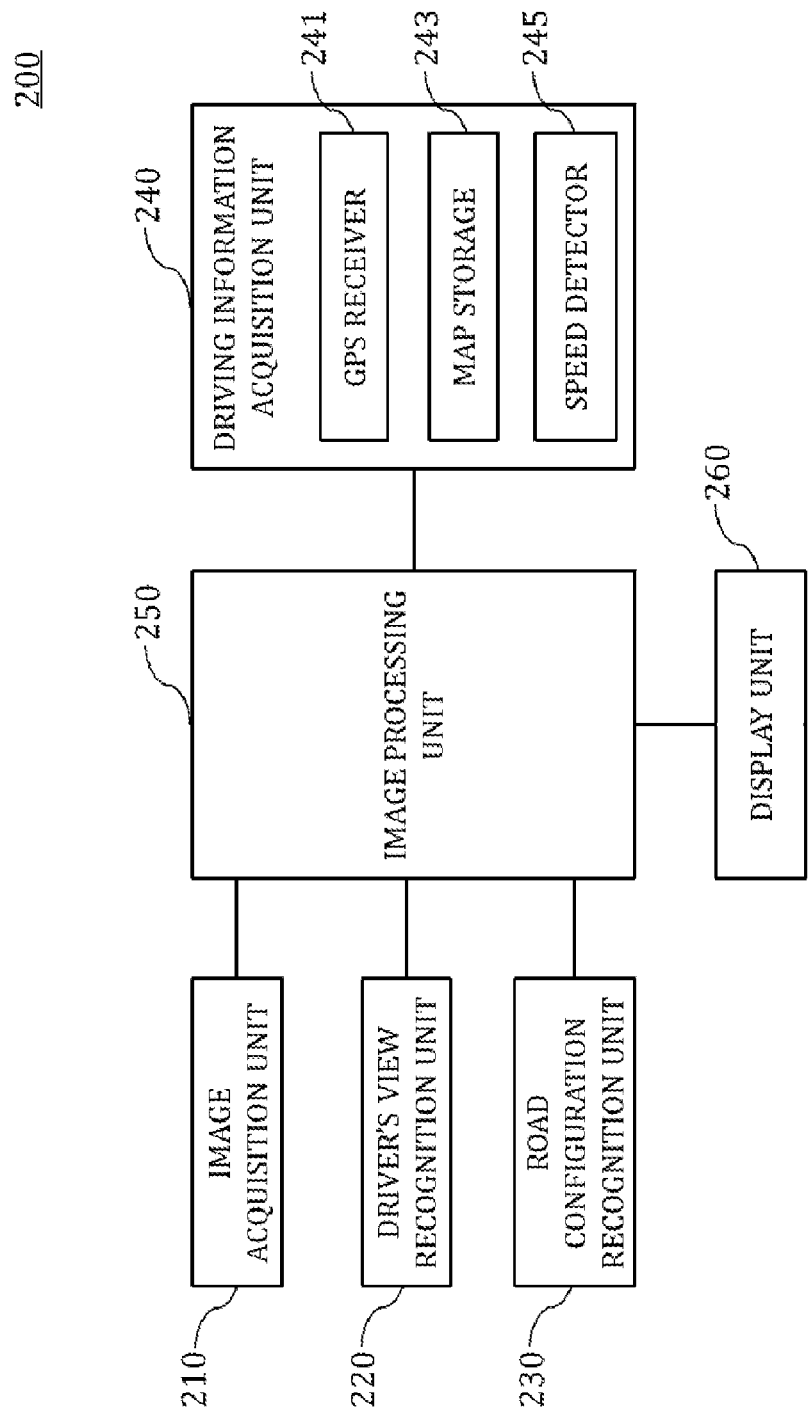
FIG. 2 is a block diagram illustrating respective elements of a route guidance apparatus shown in FIG. 1 in accordance with one exemplary embodiment of the present invention.

FIG. 2 is a block diagram illustrating respective elements of the route guidance apparatus shown in FIG. 1. Referring to FIG. 2, the route guidance apparatus 200 in accordance with one exemplary embodiment may include an image acquisition unit 210, a driver's view recognition unit 220, a road configuration recognition unit 230, a driving information acquisition unit 240, an image processing unit 250, and a display unit 260. The various components on the apparatus may be operated by a controller within the vehicle.

In particular, the image acquisition unit 210 may be configured to collect and/or store external image data related to a proceeding direction of the vehicle from the camera 100. The acquired image data may include real-time images, and peripheral vehicle information, information regarding roads and geography on which the vehicle is driven, etc. The image acquisition unit 210 may be configured to request reception of external images from the camera 100, collect image data from the camera 100, and transmit the image data to the image processing unit 250, when a position of the vehicle approaches to a guide point by a designated distance or less.

The guide point may include a route change section in which it is difficult for the driver to intuitively recognize a direction corresponding to a driving route and/or a warning and caution section in which it is difficult for the driver to respond to immediate driving environment change. For example, route change sections may include a forked road, an entrance/exit section, a roundabout, an intersection, a turn point, etc., and warning and caution sections may include an icy road, a falling rock alert zone, a children protection zone, a speed limit zone, a wildlife appearance zone, etc., but the scope of the present invention is not limited thereto.

Further, the image acquisition unit 210 may be configured to receive speed information of the vehicle during driving from a speed detector 245 which will be described below, and variably adjust a frame rate of the image data collected from the camera 100 using the current speed information of the vehicle. In particular, the frame rate indicates a rate of storing image data photographed by the camera 100 per unit time, and, for example, a frame rate of 30 fps indicates that 30 frame images are photographed and stored per second.

When the vehicle is driven at a high speed, if image data is constantly collected at a low frame rate, a time interval between the respective frames is long and thus it may be difficult to identify and analyze the collected image data. On the contrary, when the vehicle is driven at a low speed, if image data is constantly collected at a high frame rate, a memory load may not be effectively operated due to large-capacity image data. Therefore, the image acquisition unit 210 may be configured to increase the frame rate when the driving speed of the vehicle received from the speed detector 245 is high, and decrease the frame rate when the driving speed of the vehicle is low. For example, the high frame rate may be 60 fps or more, and the low frame rate may be 10 fps or more and 30 fps or less. However, it is apparent to persons skilled in the art that the above-mentioned range of the frame rate is exemplary and the range of the frame rate is not limited thereto.

The image acquisition unit 210 may be configured to collect image data while changing the frame rate according to the speed of the vehicle during driving, thereby reducing memory waste while more easily executing analysis of the image data. Otherwise, the image acquisition unit 210 may be configured to change the frame rate of the image data referring to information of a lookup table in which frame rates at respective speeds of the vehicle are predetermined.

Alternatively, the image acquisition unit 210 may be configured to adjust the frame rate of the image data based on a change in the driving speed of the vehicle or a change in a remaining distance. For example, the image acquisition unit 210 may be configured to increase the frame rate when the driving speed of the vehicle is increased or the remaining distance is a reference distance or less, and decrease the frame rate when the driving speed of the vehicle is decreased or the remaining distance exceeds the reference distance. The remaining distance refers to a distance from the current position of the vehicle to the guide point.

The driver's view recognition unit 220 may be configured to calculate preprocessing information to extract some regions that correspond to a driver's gaze direction from the image data photographed by the camera 100. Particularly, if the whole region of the image data is output to the display unit 260, a driver's recognition rate of the guide point may be lowered due to a difference between the range of an angle of view of an image collected by the camera 100 and the range a viewing angle recognized by driver's eyes. Therefore, the driver's view recognition unit 220 may be configured to calculate the preprocessing information to convert a view point of the collected image data into, for example, a driver's view point not a camera's view point.

Additionally, the driver's view recognition unit 220 may be configured to calculate the range of the viewing angle by detecting an eye height H and a gaze direction D of the driver in the vehicle, and transmit coordinate information of the calculated range of the viewing point to the image processing unit 250. Particularly, the driver's view recognition unit 220 may be configured to detect the driver's eye height H based on an installation position of the camera 100, estimate the gaze direction D using a face direction and a central position of the eyes of the corresponding driver, and calculate the range of the driver's viewing angle based on the detected driver's eye height H and the estimated gaze direction D.

The road configuration recognition unit 230 may be configured to detect the guide point (e.g., the route change section and/or the warning and caution section) on the driving route. Particularly, the road configuration recognition unit 230 may be configured to recognize a road configuration on the driving route by analyzing the image data collected by the image acquisition unit 210, or confirm whether a guide point is present ahead based on map information acquired by the driving information acquisition unit 240. Otherwise, the road configuration recognition unit 230 may be configured to acquire information regarding the guide point from a server (not shown) via vehicle to everything (V2X) communication.

The driving information acquisition unit 240 may include a global positioning system (GPS) receiver 241, a map storage 243 and the speed detector 245. The GPS receiver 241 may be configured to acquire current position information of the vehicle by receiving a navigation message from at least one GPS satellite located above the earth. In particular, the GPS receiver 241 may be configured to acquire coordinates of the current position of the vehicle by measuring a delay time of electromagnetic waves emitted from the GPS satellite.

The map storage 243 may be configured to store map information as a database. The map information may include driving route information, environment information of roads (e.g., information regarding guide points, such as a forked road, an entrance/exit section, a roundabout, an intersection, a turn point, an icy road, a falling rock alert zone, a children protection zone, a speed limit zone, a wildlife appearance zone, etc.), and street view images matched with position information, and be updated automatically each designated cycle using wireless communication or be updated manually by a user.

The speed detector 245 may be configured to detect speed information of the vehicle while the vehicle is being driven. In addition, the speed detector 245 may be configured to autonomously calculate the speed of the vehicle through the GPS receiver 241, or receive speed information detected by communicating with a speed sensor, an acceleration sensor, a yaw rate sensor, etc., in the vehicle. The image processing unit 250 may be configured to extract some regions of the image data collected by the image acquisition unit 210 based on the range of the viewing angle calculated by the driver's view recognition unit 220. This will be described in more detail with reference to FIGS. 3 and 4.

Figure 3:
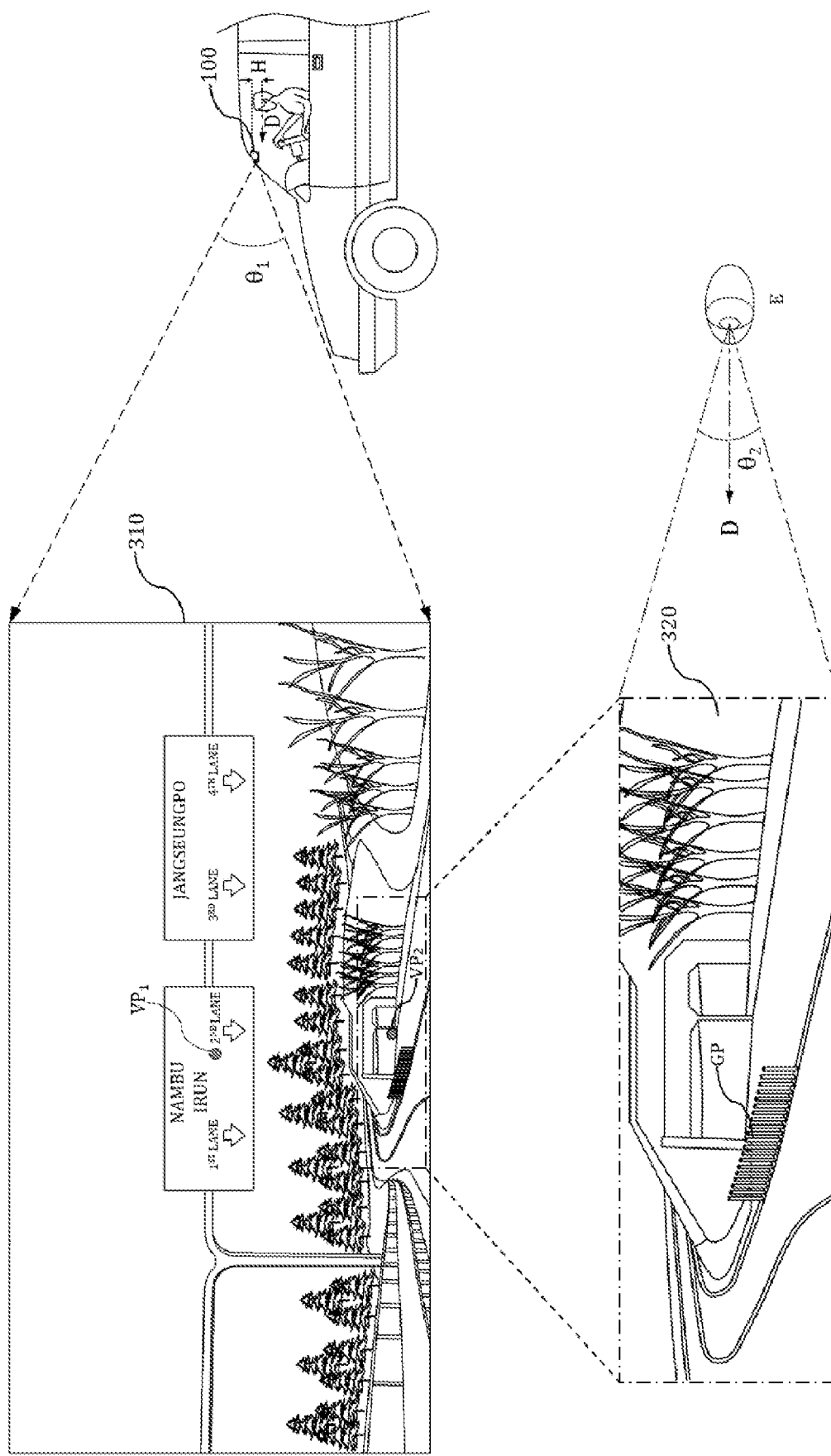
FIG. 3 is a view illustrating one exemplary algorithm to correct image data through the route guidance apparatus in accordance with one exemplary embodiment of the present invention.

FIG. 3 is a view illustrating one exemplary algorithm to correct image data through the route guidance apparatus in accordance with one exemplary embodiment of the present invention. Referring to FIG. 3, since the range of an angle of view $\theta_1$ of image data 310 collected by the camera 100 is broader than the range of a viewing angle $\theta_2$ recognized by driver's eyes E, if the whole region of the image data 310 is provided to a driver, a driver's load in recognition of information regarding a guide point GP is caused and thus driving safety and convenience may be lowered.

Particularly, if a guide point is located close to the current position of the vehicle or guide points continuously appear, a driver's recognition rate of the guide point(s) is lowered and may thus cause confusion of a driving route and increase in danger of an accident due to an error in judgment. Therefore, the image processing unit 250 provides an algorithm to correct the image data 310 based on a driver's view point $VP_2$ not a camera's view point $VP_1$.

In particular, the image processing unit 250 may be configured to extract a region of interest (ROI) 320 by matching coordinate information regarding the range of the viewing angle $\theta_2$ calculated by the driver's view recognition unit 220 with the image data 310 photographed by the camera 100. The ROI 320 may be defined as a region that corresponds to the gaze direction D of the driver, out of the image data 310.

Accordingly, the image processing unit 250 may be configured extract only a region matched with the driver's view point $VP_2$ from the image data 310 of an area in front of the vehicle collected by the image processing unit 250 so that the ROI 320 coincides with a driver's visible region, thereby reducing a driver's cognitive load and reducing danger of an accident due to an error of a driving route.

Further, the image processing unit 250 may be configured to generate a route guidance image by overlaying a guidance identifier on the extracted ROI 320. Particularly, guidance identifiers are varied according to types of guide points detected by the road configuration recognition unit 230 and may include, for example, a direction indicator that corresponds to the driving route and/or a warning indicator that corresponds to the driving environment. A detailed description thereof will be given below with reference to FIGS. 4 and 5.

Figure 4:
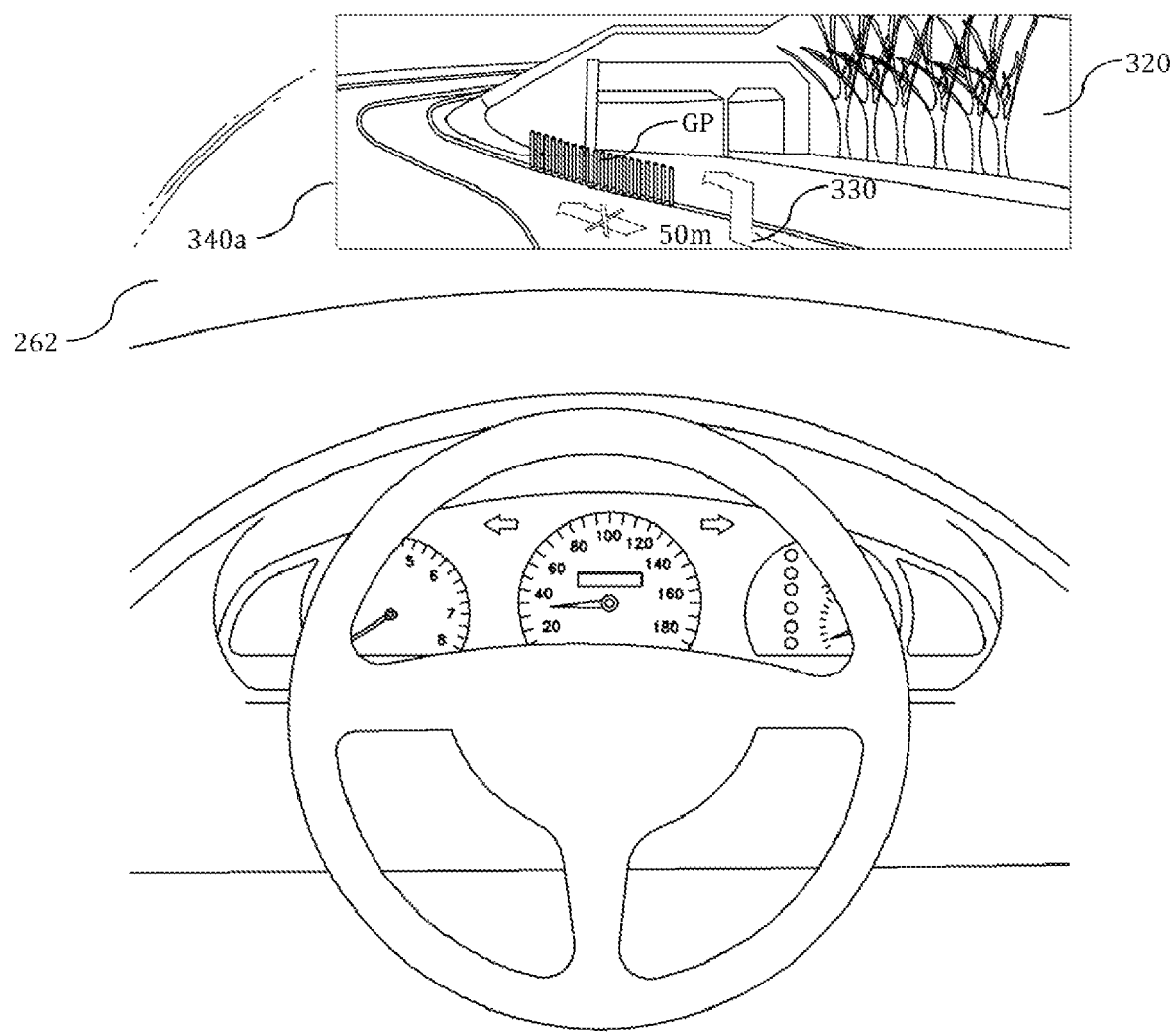
FIG. 4 is a view illustrating one exemplary route guidance image displayed by the route guidance apparatus in accordance with one exemplary embodiment of the present invention.

FIG. 4 is a view illustrating one exemplary route guidance image displayed by the route guidance apparatus in accordance with one exemplary embodiment of the present invention. Referring to FIG. 4, when the guide point detected by the road configuration recognition unit 230 is a route change section, such as a forked road, an entrance/exit section, a roundabout, an intersection or a turn point, the image processing unit 250 may be configured to generate a route guidance image 240a by overlaying a direction indicator 330 corresponding to a driving route on the extracted ROI 320.

The image processing unit 250 may be configured to variably adjust (e.g., enlarge or reduce) the size of the route guidance image 340a under the condition that the same resolution is maintained. For example, the image processing unit 250 may be configured to enlarge the size of the extracted ROI 320, and thus lower possibility of an error in which the driver is unable to detect the guide point GP. Further, the image processing unit 250 may be configured to determine at least one of the size, shape or position of the direction indicator 330 based on the remaining distance from the current position of the vehicle to the guide point GP.

For example, the image processing unit 250 may be configured to calculate the remaining distance to the guide point GP based on current position coordinates of the vehicle received by the GPS receiver 241 and map information stored in advance in the map storage 243, and gradually enlarge the size of the direction indicator 330 as the remaining distance is decreased. Further, the image processing unit 250 may be configured to move the position of the direction indicator 330 as the remaining distance is varied. Accordingly, the driver may not only approximately estimate the remaining distance, but also increase direct identification of change in direction since the size of the direction indicator 330 is enlarged as the vehicle approaches the guide point GP.

Additionally, the display unit 260 may be configured to output the route guidance image 340a generated by the image processing unit 250 to provide the route guidance image 340a to the driver. The display unit 260 may be installed on a dashboard or a windshield in front of a driver's seat, and be formed of a transparent material. For example, the display unit 260 may be implemented as at least one of a liquid crystal display (LCD), a thin film transistor liquid crystal display (TFT LCD), an organic light emitting diode (OLED), a flexible display, a 3D display, a transparent display, a head-up display or a touch screen. Although FIG. 4 illustrates the display unit 260 as being mounted on a windshield 262, the scope of the invention is not limited thereto.

The display unit 260 may be configured to output the route guidance image 340a to an area in which driver's gaze is mapped based on the driver's gaze direction D detected by the driver's view recognition unit 220, and may thus increase driver's visibility. Further, the display unit 260 may be configured to provide notification service information to the driver, when the driver does not recognize the guide point GP due to driver's inattention.

Figure 5:
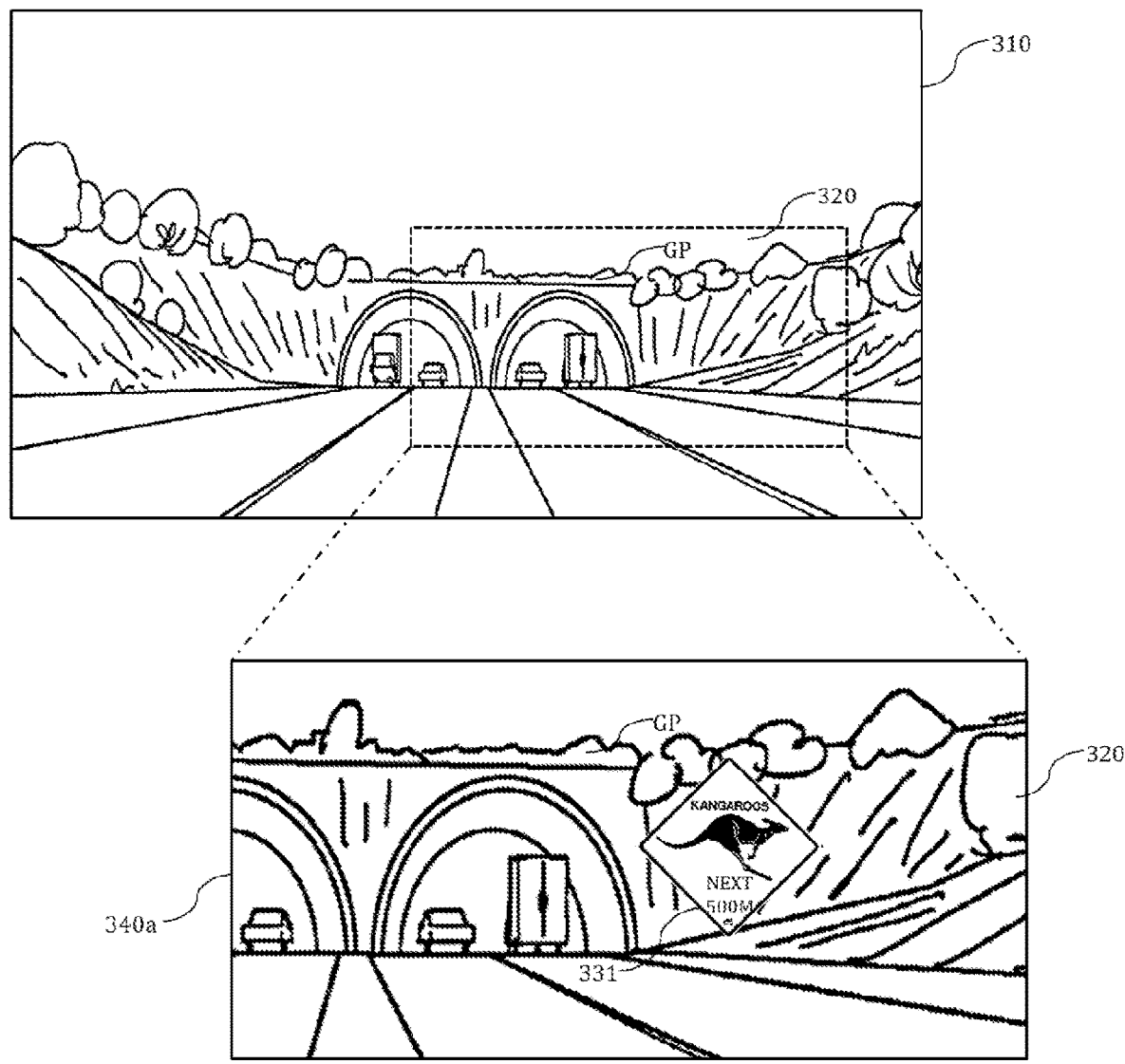
FIG. 5 is a view illustrating another exemplary route guidance image displayed by the route guidance apparatus in accordance with one exemplary embodiment of the present invention.

FIG. 5 is a view illustrating another exemplary route guidance image displayed by the route guidance apparatus in accordance with one exemplary embodiment of the present invention. Description of contents of this route guidance image which are the same as those of the above-described route guidance image will be omitted for convenience of description.

The route guidance image 340a shown in FIG. 5 differs from the route guidance image 340a shown in FIGS. 3 and 4 in that the guide point GP detected by the road configuration recognition unit 230 in the route guidance image 340a shown in FIG. 5 is a warning and caution section and the guide point GP detected by the road configuration recognition unit 230 in the route guidance image 340a shown in FIGS. 3 and 4 is a route change section.

Referring to FIG. 5, when the road configuration recognition unit 230 detects the guide point GP corresponding to the warning and caution section, the image acquisition unit 210 may be configured to collect image data 310 of an area in front of the vehicle, and the driver's view recognition unit 220 may be configured to calculate the range of a driver's viewing angle based on a driver's gaze direction. The warning and caution section may include a section requiring a driver's attention based on change in a driving environment, for example, an icy road, a falling rock alert zone, a children protection zone, a speed limit zone or a wildlife appearance zone.

The image processing unit 250 may then be configured to extract a region of interest (ROI) 320 by matching coordinate information regarding the range of the driver's viewing angle calculated by the driver's view recognition unit 220 with the image data 310 acquired by the image acquisition unit 210. Further, the image processing unit 250 may be configured to generate the route guidance image 240a by overlaying a warning indicator 331 that corresponds to a driving environment on the extracted ROI 320. In particular, the image processing unit 250 may be configured to variably adjust at least one of the size, shape or position of the warning indicator 331 based on a remaining distance from the current position of the vehicle to the guide point GP.

For example, when the detected guide point GP is a wildlife appearance zone, as exemplarily shown in FIG. 5, the image processing unit 250 may be configured to display the warning indicator 331, such as a wildlife caution sign, on the ROI 320 to allow the driver to decelerate the vehicle in advance or be careful, thereby preventing roadkill and ensuring driver safety. Although not shown in the drawings, it will be apparent to those skilled in the art that, if a guide point including an icy road, a falling rock alert zone, a children protection zone or a speed limit zone is detected, a warning indicator, such as a warning or a caution sign that corresponds to each driving environment, may be overlaid on the ROI 320.

Figure 6A:
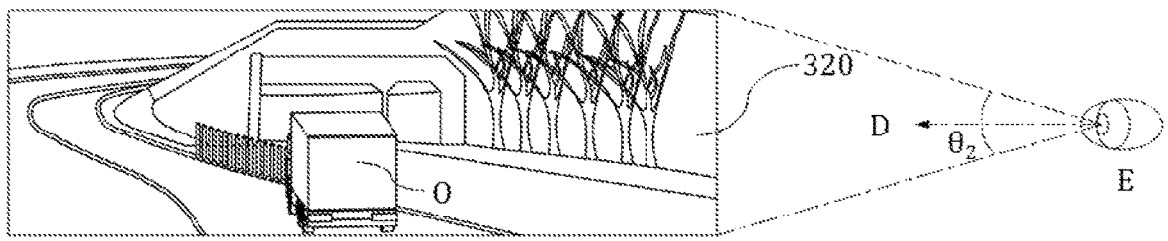
FIGS. 6A to 6C are views illustrating another exemplary algorithm to correct image data through the route guidance apparatus in accordance with one exemplary embodiment of the present invention.
Figure 6B:
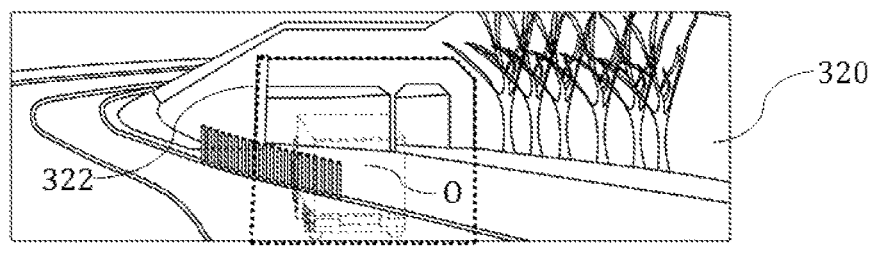
Figure 6B:
Figure 6B:
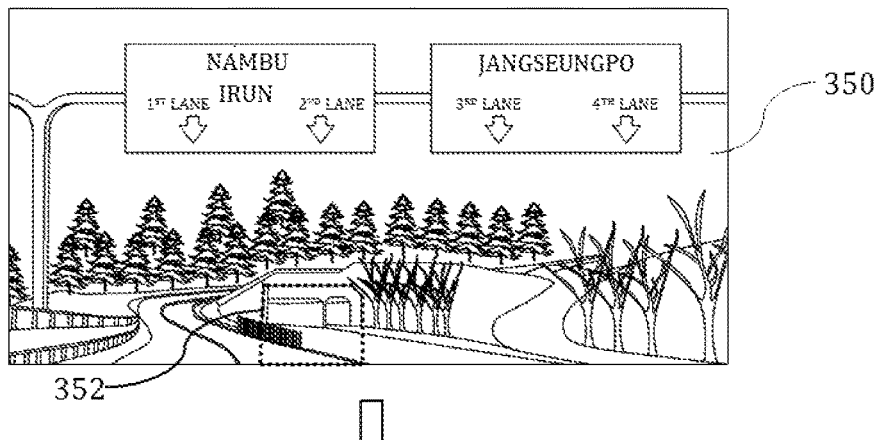
Figure 6B:
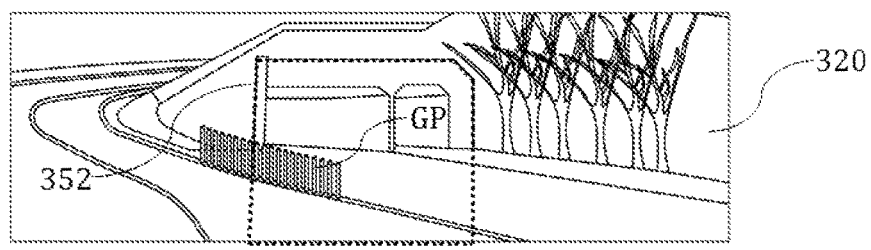
Figure 6C:
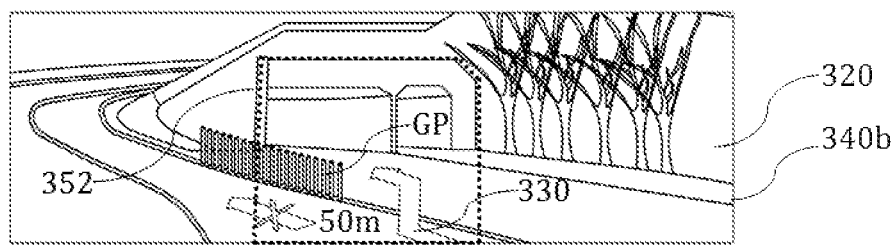

FIGS. 6A to 6C are views illustrating another exemplary algorithm to correct image data through the route guidance apparatus in accordance with one exemplary embodiment of the present invention. Hereinafter, description of contents of this algorithm which are the same as those of the above-described algorithm will be omitted for convenience of description.

Referring to FIG. 6A, differently from the algorithm shown in FIG. 3, in the ROI 320 extracted from the image data 310, an object O present in front of the vehicle blocks the driver's view and thus the driver is unable to see the guide point GP. In such a situation, it may be difficult for the driver to accurately recognize information regarding the guide point GP and thus driving safety and convenience may be reduced. Therefore, the image processing unit 250 in accordance with one exemplary embodiment proposes an algorithm to correct the extracted ROI 320, and such an algorithm will be described below with reference to FIGS. 6B and 6C.

Referring to FIG. 6B, the image processing unit 250 may be configured to identify at least one object O interfering with the guide point GP on the ROI 320, and detect a first feature point 322 of one area in which the corresponding object O is displayed. In particular, the first feature point 322 refers to surrounding environment information which is not changed regardless of change in a view point, such as the installation height, direction or scale of the camera, and may include, for example, a building, a road, a tunnel, a bridge or an underpass.

Further, the image processing unit 250 may be configured to acquire a street view image 350 matched with the current position of the vehicle, and match the street view image 350 with an area of the ROI 320, in which the at least one object O is displayed. The street view image 350 is an image photographed along a driving road or a sidewalk displayed on a map, and GPS coordinates may be also provided through such a street view image 350.

The image processing unit 250 may be configured to acquire the street view image 350 that corresponds to the current position of the vehicle through map information stored in the map storage 243 or image data collected by the image acquisition unit 210. Otherwise, the image processing unit 250 may be configured to receive the street view image 350 that corresponds to the current position of the vehicle via vehicle to everything (V2X) communication with a preceding vehicle.

The image processing unit 250 may be configured to detect a second feature point 352 that corresponds to the first feature point 322 of the ROI 320 from the street view image 350, and acquire an image from which the at least one object O is removed by matching the first feature point 322 and the second feature point 352 with each other. Particularly, in the same manner as the first feature point 322, the second feature point 352 refers to surrounding environment information which is not changed regardless of change in a view point, such as the installation height, direction or scale of the camera, and may include, for example, a building, a road, a tunnel, a bridge or an underpass. The image processing unit 250 may be configured to match the second feature point 352 with the first feature point 322 by rotating, translating or scaling the second feature point 352, to correct a difference in view points between the ROI 320 and the street view image 350.

Referring to FIG. 6C, the image processing unit 250 may be configured to generate a route guidance image 340b by overlaying a direction indicator 330 that corresponds to a driving route on an image acquired by matching the second feature point 352 of the street view image 350 with the ROI 320. Further, the display unit 260 may be configured to output the route guidance image 340b generated by the image processing unit 250 to provide the route guidance image 340b to the driver.

Figure 7:
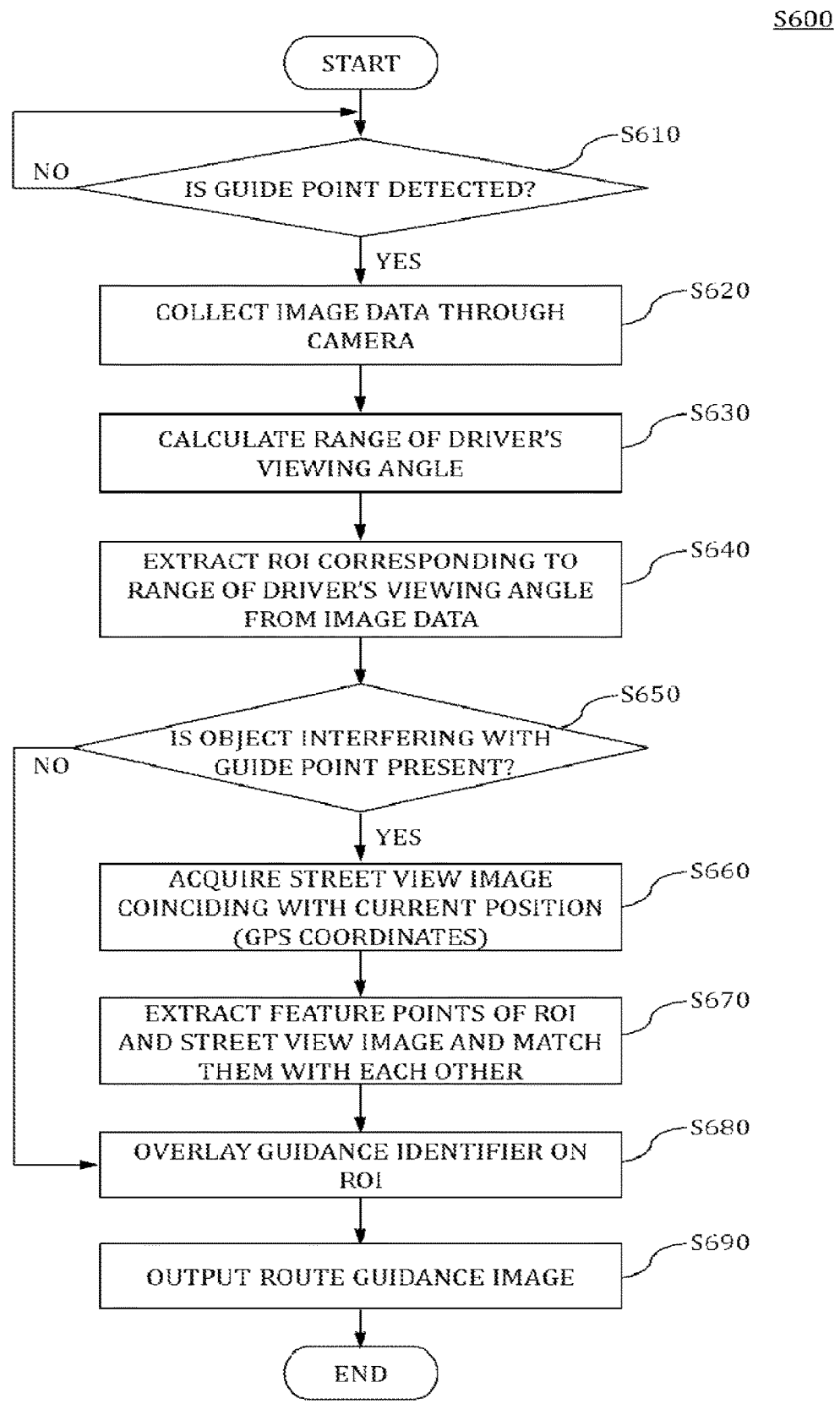
FIG. 7 is a flowchart illustrating a route guidance method in accordance with one exemplary embodiment of the present invention.

Hereinafter, a route guidance method to improve driver's visibility and driving safety using the above-described route guidance system will be described with reference to FIG. 7. FIG. 7 is a flowchart illustrating a route guidance method in accordance with one exemplary embodiment of the present invention. The method described herein below may be executed by a vehicle controller.

Referring to FIG. 7, a route guidance method (Operation S600) in accordance with one exemplary embodiment may include detecting a guide point GP (Operation S610), collecting image data based on a camera's view point (Operation S620), calculating the range of a driver's viewing angle (Operation S630), extracting a region of interest based on a driver's view point (Operation S640), identifying an object (Operation S650), acquiring a street view image (Operation S660), extracting feature points from the region of interest and the street view images and matching the feature points with each other (Operation S670), overlaying a guidance identifier (Operation S680), and outputting a route guidance image (Operation S690).

First, the road configuration recognition unit 230 may be configured to detect the guide point GP on a driving route (Operation S610). The guide point GP may include a point at which it is difficult for the driver to intuitively recognize a direction corresponding to the driving route, such as a forked road, an entrance/exit section, a roundabout, an intersection or a turn point. The road configuration recognition unit 230 may be configured to recognize a road configuration on the driving route based on map information acquired by the map storage 243, and confirm whether the guide point GP is present in front of the vehicle.

When the guide point GP is detected (Yes in Operation S610), the image acquisition unit 210 may be configured to collect and/or store external image data regarding the proceeding direction of the vehicle from the camera 100 (Operation S620). In particular, the acquired image data may include real-time images, and peripheral vehicle information, information regarding roads and geography on which the vehicle is driven, etc. The image acquisition unit 210 may be configured to request reception of external images from the camera 100, collect image data from the camera 100, and transmit the image data to the image processing unit 250, when a position of the vehicle approaches the guide point GP by a designated distance or less.

Further, in Operation S620, the image processing unit 250 may be configured to receive speed information of the vehicle from the speed detector 245 while the vehicle is being driven, and variably adjust a frame rate of the image data 310 collected from the camera 100 using the current speed information of the vehicle. For example, the image acquisition unit 210 may be configured to increase the frame rate when the driving speed of the vehicle received from the speed detector 245 is high, and decrease the frame rate when the driving speed of the vehicle is low. Accordingly, the image processing unit 250 may be configured to collect image data while changing the frame rate according to the speed of the vehicle during driving, thereby reducing memory waste while executing analysis of the image data 310.

Thereafter, the driver's view recognition unit 220 may be configured to calculate the range of a driver's viewing angle by detecting an eye height H and a gaze direction D of the driver in the vehicle, and transmit coordinate information of the calculated range of the driver's viewing angle to the image processing unit 250 (Operation S630). In particular, the driver's view recognition unit 220 may be configured to detect the driver's eye height H based on an installation position of the camera 100, estimate the gaze direction D using a face direction and a central position of the eyes of the corresponding driver, and calculate the range of the driver's viewing angle in consideration of the detected driver's eye height H and the estimated gaze direction D.

Thereafter, the image processing unit 250 may be configured to extract a region of interest (ROI) by matching coordinate information of the range of the driver's viewing angle calculated by the driver's view recognition unit 220 with the image data acquired by the image acquisition unit 210. Since, in general, the range of an angle of view of the image data collected by the camera 100 is wider than the range of a viewing angle recognized by driver's eyes, when the whole region of the image data is provided to the driver, a driver's load in recognition of information regarding the guide point GP is caused and thus driving safety and convenience may be reduced. Therefore, the image processing unit 250 may be configured to extract only a region of the image data based on a driver's view point not a camera's view point to coincide with a driver's visible region, thereby reducing the driver's cognitive load and reducing danger of an accident due to an error of the driving route.

Further, the image processing unit 250 may be configured to identify at least one object O interfering with the guide point GP in the extracted ROI (Operation S650). When the at least one object O is identified (Yes in Operation S650), the image processing unit 250 may be configured to acquire a street view image matched with the current position of the vehicle (Operation S660), and match the street view image with one area of the ROI, in which the at least one object O is displayed (Operation S670).

Particularly, the image processing unit 250 may be configured to detect a first feature point of the area of the ROI, in which the corresponding object O is displayed, and a second feature point of the street view image, and acquire an image from which the at least one object O is removed by matching the first feature point and the second feature point with each other. The first and second feature points correspond to each other, and may refer to surrounding environment information which is not changed regardless of change in a view point, such as the installation height, direction or scale of the camera 100.

Further, in Operation S670, the image processing unit 250 may be configured to correct a difference in view points between the ROI and the street view image by matching the second feature point with the first feature point by rotating, translating or scaling the second feature point. Thereafter, the image processing unit 250 may be configured to generate a route guidance image by overlaying a direction indicator that corresponds to the driving route and/or a warning indicator that corresponds to a driving environment on an image acquired by matching the second feature point of the street view image with the ROI (Operation S680).

When the at least one object O is not identified (No in Operation S650), the image processing unit 250 may skip to Operation S680 and thus may be configured to generate a route guidance image by overlaying a guidance identifier, for example, a direction indicator and/or a warning indicator, on the extracted ROI. In Operation S680, the image processing unit 250 may be configured to determine at least one of the size, shape or position of the guidance identifier based on a remaining distance from the current position of the vehicle to the guide point GP.

For example, the image processing unit 250 may be configured to calculate the remaining distance to the guide point GP based on current position coordinates of the vehicle received by the GPS receiver 241 and map information stored in advance in the map storage 243, and gradually enlarge the size of the guidance identifier as the remaining distance is decreased. Further, the image processing unit 250 may be configured to move the position of the guidance identifier as the remaining distance varies. Thereby, the driver may not only approximately estimate the remaining distance, but also increase direct identification of change in direction or change in the driving environment since the size of the guidance identifier is increased as the vehicle gets closer to the guide point GP.

After Operation S680, the display unit 260 may be configured to output the route guidance image generated by the image processing unit 250 to provide the route guidance image to the driver (Operation S690), and then route guidance may be terminated. Particularly, the display unit 260 may be configured to output the route guidance image to an area in which driver's gaze is mapped based on the driver's gaze direction D detected by the driver's view recognition unit 220, and may thus increase driver's visibility.

The above-described route guidance method in accordance with one exemplary embodiment may be recorded as a program which may be executed in computers and be stored in a non-transitory computer readable recording medium and, for example, computer readable recording media may include a ROM, a RAM, a CD-ROM, a magnetic tape, a floppy disk, an optical data storage device, etc.

The non-transitory computer readable recording media may be distributed to computer systems connected by a network and, herein, computer readable code may be stored and executed in a distributed manner. Further, functional programs, code and code segments to implement the above-described method may be easily deduced by programmers in the art to which the embodiments pertain.

As apparent from the above description, in a route guidance apparatus and method in accordance with at least one exemplary embodiment of the present invention, a real road image matched with a driver's visible region in consideration of a difference between the range of a camera's angle of view and the range of a driver's viewing angle may be displayed on a screen, and thus a driver's load in recognition of a guide point may be reduced and driver visibility may be improved. Further, the shape, size or position of a direction indicator may be variably determined based on a remaining distance to the guide point, and thus, change in direction and distance may be momentarily recognized and danger of an accident due to an error of a driving route may be reduced.

While the invention has been explained in relation to the exemplary embodiments thereof, it will be understood that various modifications thereof will become apparent to those skilled in the art upon reading the specification. Technical contents of the above-described embodiments may be combined into various types unless they are mutually incompatible, and thereby, new exemplary embodiments may be implemented.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A route guidance apparatus, comprising:
    a camera configured to collect image data of an area in front of a vehicle, photographed by the camera;
    a driver's view calculator configured to calculate a range of a driver viewing angle by detecting a driver eye height and a driver gaze direction; an image processor configured to extract a region of interest that corresponds to the range of the driver viewing angle, which is output from the driver's view calculator, from the image data and to generate a route guidance image by overlaying a direction indicator that corresponds to a driving route on the region of interest; and
    a display configured to output the route guidance image output from the image processor, the image processor being connected to the display,
    wherein the image processor is configured to remove a partial area corresponding to at least one object from the extracted region of interest, when the at least one object that obstructs a guide point on the driving route is identified in the extracted region of interest,
    wherein the image processor detects a first feature point of one area in which at least one object is displayed and a second feature point corresponding to the first feature point of the region of interest from a street view image corresponding to a current position of the vehicle,
    wherein the image processor acquires, from the street view image, an image from which at least one object is removed by matching the first feature point and the second feature point with each other and restores the removed partial area using the acquired image, and
    wherein the image processor is configured to match the second feature point with the first feature point by rotating, translating or scaling the second feature point, to correct a difference in view points between the region of interest and the street view image.

2. The route guidance apparatus according to claim 1, wherein the region of interest is a region that corresponds to the driver gaze direction, out of the image data.

3. The route guidance apparatus according to claim 1, further comprising:
    a road configuration recognition sensor configured to detect the guide point on the driving route which communicates with a server.

4. The route guidance apparatus according to claim 3, wherein the image processor is configured to determine at least one of a size, a shape or a position of the direction indicator based on a remaining distance from the current position of the vehicle to the guide point.

5. The route guidance apparatus according to claim 3, wherein the guide point includes at least one selected from the group consisting of: a forked road, an entrance/exit section, a roundabout, an intersection, and a turn point.

6. The route guidance apparatus according to claim 1, wherein the camera is configured to variably adjust a frame rate of the image data received from the camera using current speed information of the vehicle.

7. A route guidance method, comprising:
    collecting, by a processor, image data of an area in front of a vehicle, photographed by a camera;
    calculating, by a calculator, the range of a driver viewing angle by detecting a driver eye height and a driver gaze direction;
    extracting, by the processor, a region of interest that corresponds to the range of the driver viewing angle from the image data;
    generating, by the processor, a route guidance image by overlaying a direction indicator that corresponds to a driving route on the region of interest; and
    outputting, by the processor, the route guidance image,
    wherein the generating of the route guidance image includes:
        determining that at least one object obstructs a guide point on the driving route in the extracted region of interest;
        upon response to the determining, removing a partial area corresponding to the at least one object from the extracted region of interest,
        detecting a first feature point of one area in which the at least one object is displayed and a second feature point corresponding to the first feature point of the region of interest from a street view image corresponding to a current position of the vehicle, and
        acquiring, from the street view image, an image from which the at least one object is removed by matching the first feature point and the second feature point with each other and restoring the removed partial area using the acquired image, wherein the second feature point is matched with the first feature point by rotating, translating or scaling the second feature point, to correct a difference in view points between the region of interest and the street view image.

8. The route guidance method according to claim 7, wherein the region of interest is a region that corresponds to the driver gaze direction, out of the image data.

9. The route guidance method according to claim 7, further comprising
   detecting, by the processor, the guide point on the driving route.

10. The route guidance method according to claim 9, wherein the generating the route guidance image includes:
    determining, by the processor, at least one of a size, a shape or a position of the direction indicator based on a remaining distance from the current position of the vehicle to the guide point.

11. The route guidance method according to claim 9, wherein the guide point includes at least one selected from the group consisting of: a forked road, an entrance exit section, a roundabout, an intersection, and a turn point.

12. The route guidance method according to claim 7, wherein the collecting the image data includes:
    variably adjusting, by the processor, a frame rate of the image data received from the camera using current speed information of the vehicle.

13. A non-transitory computer readable recording medium having recorded thereon an application program, which when executed by a processor, causes the processor to perform the route guidance method according to claim 7.

* * * * *